United States Patent
Preda et al.

(10) Patent No.: US 9,894,517 B2
(45) Date of Patent: Feb. 13, 2018

(54) METHODS AND APPARATUSES FOR HANDLING DATA TRAFFIC IN A RADIO NODE HAVING A SPLIT PROTOCOL STACK

(71) Applicant: Telefonaktiebolaget L M Ericsson (publ), Stockholm (SE)

(72) Inventors: Stere Preda, Longueuil (CA); Suresh Krishnan, Johns Creek, GA (US); Catherine Truchan, Lorraine (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 222 days.

(21) Appl. No.: 14/760,370

(22) PCT Filed: Jun. 29, 2015

(86) PCT No.: PCT/US2015/038237
§ 371 (c)(1),
(2) Date: Jul. 10, 2015

(87) PCT Pub. No.: WO2017/003418
PCT Pub. Date: Jan. 5, 2017

(65) Prior Publication Data
US 2017/0142577 A1    May 18, 2017

(51) Int. Cl.
*H04W 12/02* (2009.01)
*H04L 29/06* (2006.01)
*H04W 88/16* (2009.01)

(52) U.S. Cl.
CPC ......... *H04W 12/02* (2013.01); *H04L 63/0442* (2013.01); *H04L 63/0471* (2013.01); *H04L 2209/80* (2013.01); *H04W 88/16* (2013.01)

(58) Field of Classification Search
CPC .... H04W 88/16; H04L 63/04; H04L 63/0428; H04L 63/0442; H04L 63/0471
See application file for complete search history.

(56) References Cited

U.S. PATENT DOCUMENTS 8,144,684 B2 * 3/2012 Harper .................. H04W 8/082
                                                    370/328
8,526,448 B2 * 9/2013 Velandy ................ H04W 76/00
                                                    370/252
(Continued)

FOREIGN PATENT DOCUMENTS

| EP | 2207399 A1 | 7/2010 |
| EP | 2 207 399 | * 3/2013 |
| WO | 2010039085 A1 | 4/2010 |

OTHER PUBLICATIONS

3GPP, "3rd Generation Partnership Project; Technical Specification Group Core Network and Terminals; Mobile radio interface Layer 3 specification; Core network protocols; Stage 3 (Release 12)", 3GPP TS 24.008 V12.4.0, Dec. 2013, 1-685.

(Continued)

*Primary Examiner* — Khang Do
(74) *Attorney, Agent, or Firm* — Murphy, Bilak & Homiller, PLLC

(57) ABSTRACT

In one aspect of the teachings herein, a radio node provides a local loopback mode of operation in at least some operational instances, in which it loops "local" traffic between wireless devices operating within a local radio cell or cells, rather than forwarding such traffic along to a controlling gateway for handling. The wireless devices operating within the cell(s) and involved in the loopback operation switch over from symmetric encryption that involves the controlling gateway as a secure endpoint for their traffic, to asymmetric or public-private key pair encryption. The radio node uses a correspondingly derived loopback encryption key to enable security on the loopback traffic flow between the involved local devices. Use of the loopback encryption key means that the radio node need not know or otherwise have access to the symmetric encryption keys used by the (Continued)

involved devices and the controlling gateway for "normal" non-loopback operation.

32 Claims, 7 Drawing Sheets

(56) References Cited

U.S. PATENT DOCUMENTS

| | | | | |
|---|---|---|---|---|
| 8,538,441 | B2* | 9/2013 | Tao | H04Q 3/0016 |
| | | | | 455/445 |
| 9,326,193 | B2* | 4/2016 | Persson | H04W 36/0011 |
| 9,526,123 | B2* | 12/2016 | Li | H04L 61/2007 |
| 2008/0310404 | A1* | 12/2008 | Valme | H04M 7/006 |
| | | | | 370/353 |
| 2011/0176531 | A1* | 7/2011 | Rune | H04W 76/041 |
| | | | | 370/338 |
| 2014/0342698 | A1* | 11/2014 | Liu | H04W 36/0022 |
| | | | | 455/408 |

OTHER PUBLICATIONS

3GPP, "3rd Generation Partnership Project; Technical Specification Group Radio Access Network; Evolved Universal Terrestrial Radio Access (E-UTRA); LTE physical layer; General description (Release 12)", 3GPP TS 36.201 V12.2.0, Mar. 2015, 1-14.

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.5.0, Mar. 2015, 1-77.

3GPP, "3rd Generation Partnership Project; Technical Specification Group Radio Access Network; Evolved Universal Terrestrial Radio Access (E-UTRA); Packet Data Convergence Protocol (PDCP) specification (Release 10)", 3GPP TS 36.323 V10.2.0, Dec. 2012, 1-26.

3GPP, "3rd Generation Partnership Project; Technical Specification Group Radio Access Network; Evolved Universal Terrestrial Radio Access (E-UTRA); Packet Data Convergence Protocol (PDCP) specification (Release 12)", 3GPP TS 36.323 V12.3.0, Mar. 2015, 1-33.

3GPP, "3rd Generation Partnership Project; Technical Specification Group Radio Access Network; Evolved Universal Terrestrial Radio Access (E-UTRA); Radio Link Control (RLC) protocol specification (Release 12)", 3GPP TS 36.322 V12.2.0, Mar. 2015, 1-40.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.0.0, Dec. 2013, 1-344.

3GPP, "3rd Generation Partnership Project; Technical Specification Group Services and System Aspects; 3GPP System Architecture Evolution (SAE); Security architecture (Release 12)", 3GPP TS 33.401 V12.10.0, Dec. 2013, 1-121.

Blaze, Matt et al., "Divertible Protocols and Atomic Proxy Cryptography", In Proceedings of Eurocrpt '98, vol. 1403, Chapter 3, 1998, 127-144.

Laraqui, Kim et al., "Residential Local Break Out Title of Invention in a Communication System", PCT application No. PCT/SE2014/050540, filed Apr. 30, 2014.

* cited by examiner

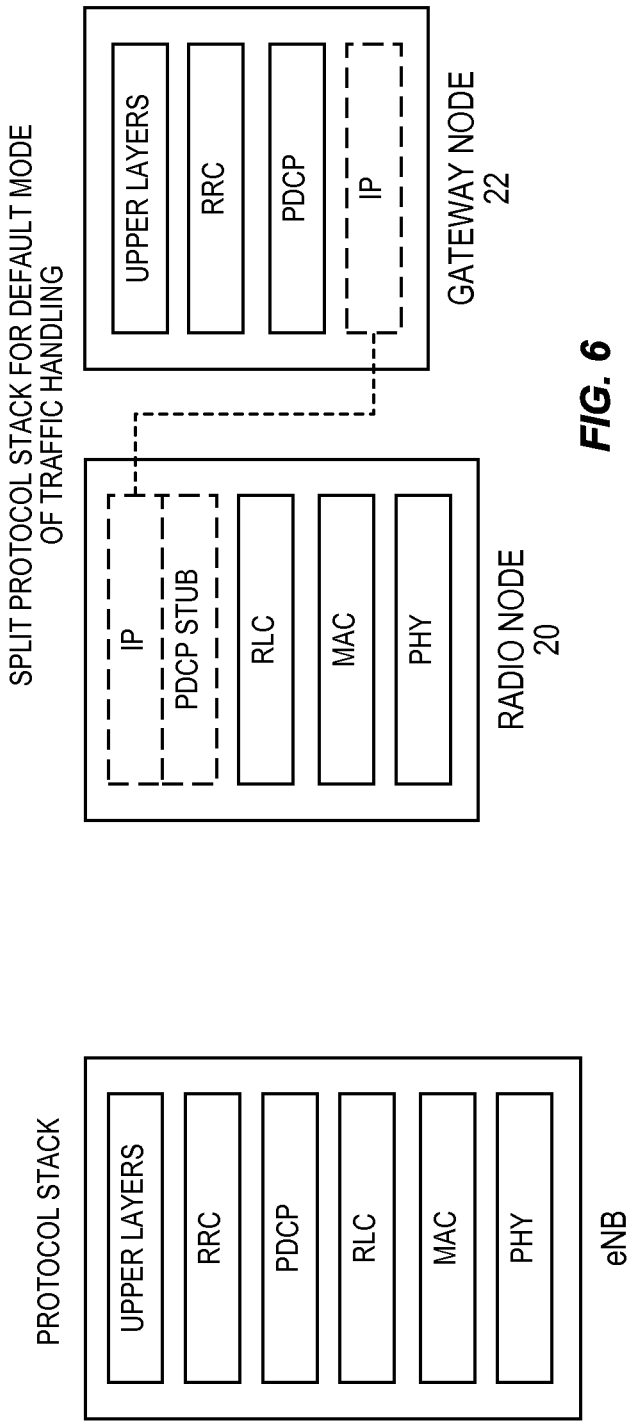

METHODS AND APPARATUSES FOR HANDLING DATA TRAFFIC IN A RADIO NODE HAVING A SPLIT PROTOCOL STACK

TECHNICAL FIELD

The present invention relates to wireless communication networks, and particularly relates to networks that use gateway-controlled radio nodes for providing the physical layer links.

BACKGROUND

Increased network density and increased heterogeneity are among the key adaptations complicating the design and implementation of wireless communication networks. Network designers and operators must balance the necessity of having good coverage, at least in areas of high use, and having the right type of coverage, e.g., high-data rate coverage, against the enormous capital and operating expenditures needed to deploy and maintain the kind of equipment needed to ensure that those necessities are being met.

In one approach to increasing network density, rather than simply adding more "macro" or large-cell base stations, network operators are deploying smaller, low-power base stations, or allowing third-parties, such as individual home-owners or other subscribers, to deploy such base stations. These base stations characteristically provide radio coverage in much smaller areas, e.g., only within the confines of a typical residence or office. Consequently, these coverage areas are often referred to as "pico" or "femto" cells.

The base stations or access points, APs, that provide small-cell coverage may or may not use the same Radio Access Technology, RAT, in use in the macro-layer of the network, and varying degrees of integration are contemplated for APs with respect to the network at large. For example, the APs may or may not be part of overall coordinated interference reduction schemes that coordinate scheduling or other operational aspects of the network across and between cells.

Merely by way of example, a network operator may lease or sell small, low-power APs that individual subscribers install in their homes or workplaces. These APs may provide better baseline coverage or they may act as higher data-rate hotspots and, as such, they may have broadband connections back to the operator's network. In a particular approach, the APs couple to the operator's network through a controlling gateway. In such implementations, the AP has an air interface for connecting to devices, and has one or more network connections, often "wired" connections, back to the controlling gateway, which in turn has some type of "backhaul" connection to the operator's core network.

The gateway arrangement provides a number of advantages. For example, one gateway may support more than one AP. Consequently, at least some of the processing can be consolidated in the gateway. The centralization of certain Radio Access Network, RAN, processing functions is a topic of growing interest, and it is envisioned as a key aspect of future-generation network implementations.

Broadly, the idea here involves dividing the overall air interface operations and management processing between the actual radio access points providing the radio bearers and centralized processing nodes that provide relatively cheap pools of processing resources that can be leveraged for potentially large numbers of radio access points, also referred to generically as "base stations". The lower-level functions, such as radio resource allocations and dynamic user scheduling are performed at the radio access nodes, which provide the actual radio link(s), while at least some of the higher-layer processing is moved to a central location.

This kind of disaggregation of the overall air interface processing protocols generally involves some "splitting" of the radio protocol stack between a radio access point and the centralized processing node. To better appreciate the split stack approach, consider the radio protocol stack used in Long Term Evolution or LTE. A wireless device and a network base station configured for operation in accordance with the LTE air interface each implements a version of the LTE protocol stack.

Protocol entities in the device-side stack mirror and communicate with corresponding peer entities in the network-side stack. The LTE stack includes a physical or PHY layer, as its bottom-most layer, a Medium Access Control, MAC, layer above the physical layer, a Radio Link Control, RLC, layer above the MAC layer, a Packet Data Convergence Protocol, PDCP, layer above the RLC layer, and a Radio Resource Control, RRC, layer above the PDCP layer. For more details regarding these layers and their functions, the interested reader may refer to the following Third Generation Partnership Project, 3GPP, Technical Specifications: TS 36.201 for a discussion of the physical layer, TS 36.321 for a discussion of the MAC layer, TS 36.322 for a discussion of the RLC layer, TS 36.323 for a discussion of the PDCP layer, and TS 36.331 for a discussion of the RRC layer.

In the context of the aforementioned gateway arrangement, a residential or other such radio access point implements a portion of the radio protocol stack, with the remaining portion of the stack implemented at the controlling gateway. This arrangement provides the twofold benefit of simplifying the radio access point and leveraging the gateway node for supporting more than one radio access point. However, the connections between the radio access points and the gateway nodes necessarily have limited bandwidth, and it is not always desirable to pass all traffic along to the gateway node.

For example, assume that two devices are both connected to the same radio access point and one device is sending traffic to the other. This traffic is "local" in the sense that the source and target devices are both connected to the radio access point. Ideally, the radio node would receive such traffic from the source device and send it directly to the target device. This type of idealized local loopback avoids the waste associated with passing local traffic up to the gateway node, only to have the gateway node send it back to the radio access point, for delivery to the target device.

However, the split-stack architecture does not readily accommodate the local loopback function for local traffic. For example, in LTE, the PDCP layer provides, among other things end-to-end ciphering for user traffic and control signaling going between a connected device and the LTE network. The PDCP entity in the device-side LTE stack provides one endpoint for the encrypted flows, while the PDCP entity in network-side LTE stack provides the other endpoint. Thus, with a split stack and with the PCDP ciphering functionality resident in the controlling gateway, the radio access point simply passes encrypted traffic and signaling between a connected device and the controlling gateway and has no knowledge of the security keys being used.

In a known solution to this problem, the gateway node provides the same ciphering keys to the radio access point, thus enabling it to perform the network-side ciphering operations. But these ciphering keys are extremely sensitive and their distribution presents security risks to the network operator and the user of the involved device. Thus, in such solutions, the radio access point must be a "trusted" node and there must be physical and logical security arrangements in place that make it feasible to distribute the ciphering keys to the radio access point. However, these trust requirements are cumbersome in at least some use cases, and significantly restrict the flexibility and range of choices available to subscribers and the network operator for adding radio access points to the network.

SUMMARY

In one aspect of the teachings herein, a radio node provides a local loopback mode of operation in at least some operational instances, in which it loops "local" traffic between wireless devices operating within a local radio cell or cells provided by the radio node, rather than forwarding such traffic along to a controlling gateway for handling. The wireless devices operating within the cell(s) and involved in the loopback operation switch over from symmetric encryption that involves the controlling gateway as a secure endpoint for their traffic, to asymmetric or public-private key pair encryption, and the radio node uses a correspondingly derived loopback encryption key to enable security on the loopback traffic flow going between the involved local devices. Use of the loopback encryption key means that the radio node need not know or otherwise have access to the symmetric encryption keys used by the involved devices and the controlling gateway for "normal" non-loopback operation.

An example embodiment is directed to a method of operation in a radio node that provides radio coverage in one or more cells, and is controlled by a gateway node that is coupled to a core network of a wireless communication network. The method comprises selectively operating in a loopback mode of traffic handling for local data traffic going between given wireless devices operating in any of the one or more cells provided by the radio node. Selective operation in the loopback mode is based on the radio node receiving control signaling from the gateway node, indicating that the loopback mode of traffic handling is to be used with respect to a local-cell connection between a first wireless device in one of the cells provided by the radio node and a second wireless device in the same or another one of the cells provided by the radio node. In response to the control signaling, the radio node changes from a default mode of traffic handling to the loopback mode of traffic handling, for the indicated local-cell connection. Subsequent to changing to the loopback mode of traffic handling, the method includes processing the local data traffic on the indicated local-cell connection according to the loopback mode of traffic handling.

Notably, in the default mode of traffic handling, both local data traffic and non-local data traffic sent from a given wireless device in any given cell provided by the radio node is encrypted by the given wireless device for decryption by the gateway node, and the radio node forwards all such data traffic to the gateway node for processing. However, in the loopback mode of traffic handling, local data traffic sent from a given wireless device in the cell is encrypted by the given wireless device using a public key from a first public-private key pair allocated to the given wireless device for the loopback mode of traffic handling.

Correspondingly, the radio node encrypts the local data traffic with a loopback encryption key derived from a private key contained in the first public-private key pair and a private key contained in a second public-private key pair used by the wireless device targeted by the local data traffic. As a consequence of using the loopback encryption key on the local data traffic sent from the given wireless device, the radio node obtains transformed local data traffic that is decipherable by the targeted wireless device using the private key of the second public-private key pair. The radio node transmits the transformed data traffic to the targeted wireless device, for decryption by the targeted wireless device.

Among the various advantages provided by the above method of loopback operation, it provides for the use of a "split" protocol stack between the radio node and the gateway node. In an example embodiment, a protocol stack used for handling data traffic in the default mode of traffic handling is split between the radio node and the gateway node. Correspondingly, the contemplated method in such embodiments further includes performing physical layer, medium access control layer, and radio link control layer protocol functions of the protocol stack at the radio node, while relying on the gateway node to provide packet data convergence protocol layer functions of the protocol stack. In the context of loopback operation, the packet data convergence protocol layer Protocol Data Units or PDUs outgoing from a first one of the wireless devices involved in the loopback connection are encrypted at the device, and the radio node re-encrypts those PDUs using its loopback encryption key, for loopback to the Radio Link Control, RLC, layer destined for the targeted wireless device, for decrypting by the targeted wireless device.

In another example embodiment, a radio node is configured to provide radio coverage in one or more cells. The radio node comprises a first communication interface configured for communicating with wireless devices operating in any of its one or more cells, and a second communication interface configured to communicatively couple the radio node to a controlling gateway node that is coupled to a core network of a wireless communication network. The radio node further includes processing circuitry that is operatively associated with the first and second communication interfaces and configured to selectively operate in a loopback mode of traffic handling for local data traffic going between given wireless devices operating in any of the cells provided by the radio node.

In particular, the processing circuitry in this example embodiment is configured to receive control signaling from the gateway node, indicating that the loopback mode of traffic handling is to be used with respect to a local-cell connection between a first wireless device in any of the one or more cells provided by the radio node and a second wireless device in the same or another one of the cells provided by the radio node. In response to the control signaling, the processing circuitry is configured to change from a default mode of traffic handling to the loopback mode of traffic handling, for the indicated local-cell connection, and, subsequent to changing to the loopback mode of traffic handling, process the local data traffic on the indicated local-cell connection according to the loopback mode of traffic handling.

In the default mode of traffic handling, local data traffic and non-local data traffic sent from a given wireless device in a given cell provided by the radio node is encrypted by the given wireless device for decryption by the gateway node, and the processing circuitry forwards all such data traffic to the gateway node for processing. Conversely, in the loopback mode of traffic handling, local data traffic sent from a given wireless device in the cell is encrypted by the given wireless device using a public key from a first public-private key pair allocated to the given wireless device for the loopback mode of traffic handling, and the processing circuitry encrypts the local data traffic with a loopback encryption key derived from a private key contained in the first public-private key pair and a private key contained in a second public-private key pair used by the wireless device targeted by the local data traffic. By performing this further encryption, the processing circuitry obtains transformed local data traffic that is decipherable by the targeted wireless device via the private key of the second public-private key pair. Correspondingly, the processing circuit is configured to transmit the transformed data traffic to the targeted wireless device, via the first communication interface.

Another example embodiment is directed to a method of operation in a gateway node that is coupled to a core network of a wireless communication network and controls a radio node that provides radio coverage in one or more cells used for connecting wireless devices to the wireless communication network. The method includes selecting a local-cell connection between first and second wireless devices operating in any of the one or more cells provided by the radio node, for changeover from a default mode of traffic handling to a loopback mode of traffic handling. In the default mode, data traffic carried by the local-cell connection flows, via the radio node, through the gateway node for processing. In the loopback mode, data traffic does not flow through the gateway node and instead is looped back by the radio node.

The method further includes sending control signaling to the radio node and to the first and second wireless devices, initiating the changeover to the loopback mode of traffic handling for the selected local-cell connection, and providing a loopback encryption key to the radio node, for use in encrypting the data traffic looped back by the radio node on the selected local-cell connection. The loopback encryption key is derived from the secret keys in first and second public-private key pairs assigned to the first and second wireless devices, respectively, for use in the loopback mode of traffic handling, and may be generated by the gateway node, or may be obtained by the gateway node from another node in the network.

In a related example embodiment, a gateway node is configured for communicatively coupling to a core network of a wireless communication network and for controlling a radio node that provides radio coverage in one or more cells for connecting wireless devices to the wireless communication network. The gateway node includes a first communication interface for communicating with the radio node, and a second communication interface for communicating with one or more nodes in the core network, and further includes processing circuitry operatively associated with the first and second communication interfaces.

The processing circuitry is configured to select a local-cell connection between first and second wireless devices operating in any of the one or more cells provided by the radio node, for changeover from a default mode of traffic handling to a loopback mode of traffic handling. In the default mode of traffic handling, data traffic carried by the local-cell connection flows, via the radio node, through the gateway node for processing. Conversely, in the loopback mode of traffic handling, the data traffic does not flow through the gateway node and instead is looped back by the radio node.

The processing circuitry of the gateway node is further configured to send control signaling to the radio node and to the first and second wireless devices, to initiate the changeover to the loopback mode of traffic handling for the selected local-cell connection, and to provide a loopback encryption key to the radio node, for use in encrypting the data traffic looped back by the radio node on the selected local-cell connection. The loopback encryption key is derived from the secret keys in first and second public-private key pairs assigned to the first and second wireless devices, respectively, for use in the loopback mode of traffic handling.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 5 is a diagram of a known protocol stack used in a base station, i.e., an "eNB", of a Long Term Evolution, LTE, network.

FIG. 6 is a diagram of a split protocol stack according to one embodiment of the teachings herein.

DETAILED DESCRIPTION

Figure 1:
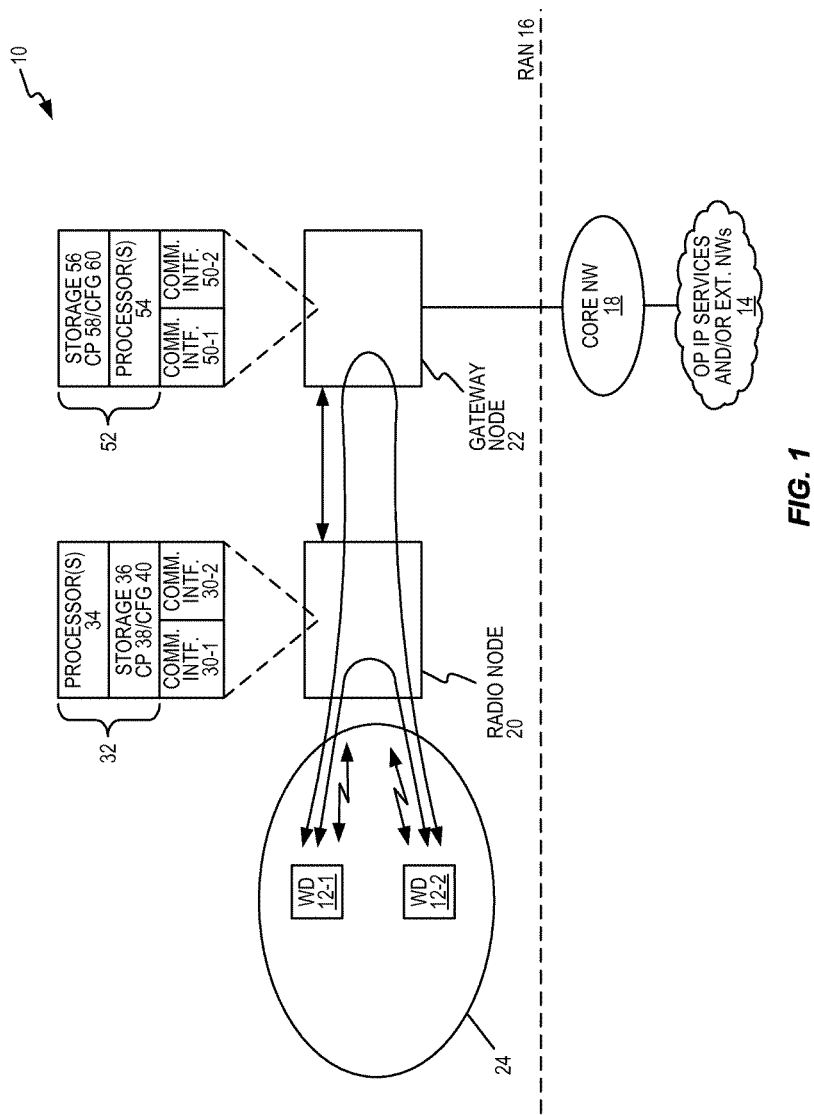
FIG. 1 is a block diagram of a wireless communication network that includes embodiments of a radio node and a gateway node that are operative according to the teachings herein.

FIG. 1 illustrates a wireless communication network 10 configured to provide communication services to any number of wireless communication devices 12, where only two such devices 12-1 and 12-2 are shown by way of example. Unless suffixes are needed for clarity, the reference number "12" is used herein, for both singular and plural reference to any given device, or devices.

The network 10 communicatively couples the individual devices 12 to one or more external networks 14, such as the Internet and, of course, may provide for inter-device communications within the network 10, which includes a Radio Access Network or RAN 16 and a Core Network or CN 18. In this example, the RAN 16 includes a radio node 20 and a gateway node 22. The gateway node 20 is configured to control the radio node 20 and to provide communicative coupling to the CN 18. By way of example, the radio node 20 is a home base station or other small-cell device that provides radio coverage in a corresponding cell or cells 24, which may have a limited coverage area, such as a low-power cell intended to encompass a single residence or other structure.

While only one cell 24 is illustrated, it will be appreciated that the radio node 20 may provide more than one cell 24, e.g., by using different carrier frequencies, using different frequency sub-bands, using Time Division Multiplexing, TDM, etc. Each such cell 24 is "local" in the sense that it is provided by the radio node 20 and, hence, the data traffic flowing between two or more devices 12 that are each connected to the network 10 via one of the radio node's cells 24 is considered to be "local data traffic". In other words, if the source and the target for the data traffic both reside in a cell 24 provided by the radio node 20, the involved connection—i.e., the involved radio bearer(s)—is considered to be a "local-cell connection" and the data traffic flowing on that connection is local data traffic. Broadly, if the source and the target for given data traffic flowing through the radio node 20 are "local" with respect to the radio node 20, then that data traffic is considered to be local data traffic. If both the source and target for data traffic flowing through the radio node 20 are not local to the radio node 20, then that traffic is considered to be "non-local data traffic".

Although only one radio node 20 and one gateway node 22 are illustrated, the network 10 may include any number of radio nodes 20, e.g., each at different locations within a broader geographic area. Further, the network 10 may include a gateway node 22 for each such radio node 20, or may have one gateway node 22 for subsets or groups of radio nodes 20. Additionally, the network 10 may include other entities not illustrated or described, as will be understood by those of ordinary skill in the wireless communication arts. For example, in one or more non-limiting embodiments, the network 10 comprises a Long Term Evolution, LTE, or LTE-Advanced network, configuring according to the applicable technical specifications promulgated by the Third Generation Partnership Project, 3GPP. Consequently, the network 10 includes a variety of nodes or other entities associated with such networks, including Mobility Management Entities or MMEs in the CN 18, along with a Packet Data Gateway Nodes or PDGN, providing a packet data interface between the CN 18 and the external network(s) 14.

Regardless of whether the radio node 20 is implemented as a LTE Home eNB, HeNB, or as some other type of radio base station, it will be understood as comprising a mix of signal processing and control circuitry, along with supporting radio transceiver circuitry. In the example illustration, the radio node 20 includes first and second communication interfaces 30-1 and 30-2—generally referred to as "communication interfaces 30"—along with processing circuitry 32 that is operatively associated with the communication interfaces 30.

The processing circuitry 32 comprises fixed circuitry, programmed circuitry, or a combination of fixed and programmed circuitry. In an example embodiment, the processing circuitry 32 is at least partly implemented using programmed circuitry and comprises, for example, one or more processors 34, such as one or more microprocessors, Digital Signal Processors or DSPs, Application Specific Integrated Circuits or ASICs, Field Programmable Gate Arrays or FPGAs, or other digital processing circuitry. Correspondingly, the processing circuitry 32 includes or is associated with one or more types of computer-readable media—"STORAGE 36" in the figure—such as one or more types of memory circuits such as FLASH, EEPROM, SRAM, DRAM, etc. Additionally, or alternatively, the storage 36 comprises hard disk storage, Solid State Disk, SSD, storage, etc.

In general, the storage 36 provides both working memory and longer-term storage. In at least one embodiment, the storage 36 provides non-transitory storage for a computer program 38 and one or more items of configuration data 40. Here, non-transitory does not necessarily mean permanent or unchanging storage, but does means storage of at least some persistence. The computer program 38, which may comprise a number of related or supporting programs, comprises program instructions that, when executed by the one or more processors 34 implement the processing circuitry 32 according to the configuration examples described herein. In other words, in some embodiments, one or more general-purpose processing circuits within the radio node 20 are specially adapted to carry out the teachings herein, based on their execution of the computer program instructions comprising the computer program 38.

However implemented, the radio node 20 is configured to provide radio coverage in one or more cells 24, and the first communication interface 30-1 is configured for communicating with wireless devices 12 operating in any of the one or more cells 24. For example, the communication interface 30-1 is configured for transmitting and receiving radiofrequency signals according to the air interface protocols and signal structure adopted for the air interface between the radio node 20 and the devices 12. To that end, the communication interface 30-1 includes one or more radiofrequency transmitters and receivers, and associated protocol processing circuitry that is adapted to support uplink and downlink air interfaces.

The radio node 20 further includes a second communication interface 30-2 configured to communicatively couple the radio node 20 to its controlling gateway node 22, which in turn is coupled to the CN 18. The second communication interface 30-2 may comprise a wired or wireless interface, e.g., a LAN or microwave-based interface, and shall be understood as providing physical-layer circuitry adapted for sending and receiving signals over the involved transmission medium, along with corresponding circuitry for protocol processing.

Still further, the processing circuitry 32 is operatively associated with the first and second communication interfaces 30-1, 30-2 and configured to selectively operate in a loopback mode of traffic handling for local data traffic going between given wireless devices 12 operating in any of the one or more cells 24. To this end, the processing circuitry 32 is configured to receive control signaling from the gateway node 22 indicating that the loopback mode of traffic handling is to be used with respect to a local-cell connection between a first wireless device 12-1 in any of the one or more cells 24 and a second wireless device 12-2 in any of the one or more cells 24. That is, the first and second wireless devices 12-1 and 12-2 may both be in the same cell 24, which could be considered as a special case of local connectivity. More generally, if the radio node 24 provides more than one cell 24, then in at least some embodiments herein, the data traffic going between two devices 12 operating in any one or more of those cells 24 is considered to be local data traffic.

The processing circuitry 32 is further configured to change from a default mode of traffic handling to the loopback mode of traffic handling, for the indicated local-cell connection, in response to the received control signaling. Subsequent to changing to the loopback mode of traffic handling, the processing circuitry 32 is configured to process the local data traffic on the indicated local-cell connection according to the loopback mode of traffic handling. In the default mode of traffic handling, local data traffic and non-local data traffic sent from a given wireless device 12 in any of the one or more cells 24 is encrypted by the given wireless device 12 for decryption by the gateway node 22, and the processing circuitry 32 forwards all such data traffic to the gateway node 22 for processing. Thus, in an example case where the given device 12 is the device 12-1 and the data traffic sent from the device 12-1 targets the device 12-2, the radio node 20 in its normal or default mode of data traffic handling would simply forward the data traffic from the device 12-1 to the gateway node 22, and receive correspondingly processed traffic in return, for transmission to the second device 12-2.

However, in the loopback mode of traffic handling, the local data traffic sent from a given wireless device 12 in any of the one or more cells 24 is encrypted by the given wireless device 12 using a public key from a first public-private key pair allocated to the given wireless device 12 for the loopback mode of traffic handling. Correspondingly, the processing circuitry 32 of the radio node 20 encrypts the local data traffic with a loopback encryption key derived from a private key contained in the first public-private key pair and a private key contained in a second public-private key pair used by the wireless device 12 targeted by the local data traffic. Thus, the processing circuitry 32 obtains transformed local data traffic that is decipherable by the targeted wireless device 12 via the private key of the second public-private key pair, and the processing circuitry 32 transmits the transformed data traffic to the targeted wireless device 12, via the first communication interface 30-1.

Thus, where the involved devices 12 are the first and second devices 12-1 and 12-2 seen in FIG. 1, the first device 12-1 operates in the loopback mode by using the public key from the public-private key pair assigned to it for loopback mode operation. The first device 12-1 thus sends local data traffic that targets the second device 12-2 and is encrypted using the public key of the first device 12-1. In turn, the radio node 20 transforms that data traffic by further encrypting it with the loopback encryption key. The loopback encryption key is derived from the secret keys of the public-private key pairs assigned to the first and second devices 12-1 and 12-2 for their operation in loopback mode, and the transformed data traffic therefore can be decrypted by the second device 12-2 using the private key of the public-private key pair assigned to the second device 12-2 for operation in the loopback mode of traffic handling.

In at least some embodiments, the processing circuitry 32 is configured to receive the loopback encryption key for the indicated local-cell connection from the gateway node 22. Further, in the same embodiment(s), or in at least some other embodiments, the processing circuitry 32 is configured to determine the local-cell connection based on the control signaling from the gateway node 22 identifying at least one of: a radio bearer used for the local-cell connection, and the first and second wireless devices 12-1, 12-2. That is, the control signaling may identify the connection—the radio bearer(s) targeted for loopback operation—and/or it may identify the devices 12 for which the loopback mode of operation is being activated.

In more detail, in at least some embodiments, the control signaling received at the radio node 20 indicates that the loopback mode of traffic handling shall be used for local data traffic going between the first and second wireless devices 12-1, 12-2 in a first direction. Correspondingly, the processing circuitry 32 is configured to change to the loopback mode of traffic handling with respect to the first direction but not with respect to local data traffic going between the first and second wireless devices 12-1, 12-2 in an opposite, second direction, unless the control signaling, or subsequent control signaling, indicates that the loopback mode of traffic handling shall be used for the second direction.

In addition to the control signaling including identifiers for the wireless devices 12 for which the loopback mode of operation is being activated, the control signaling may further include the loopback encryption key to be used for operating in the loopback mode of traffic handling with respect to the involved local-cell connection between the wireless devices 12.

Notably, in at least some embodiments, the processing circuitry 32 of the radio node 20 is configured to operate one or more connections in the default or non-loopback mode, while operating one or more other connections in the loopback mode. In the above example discussion, for instance, the first and second wireless devices 12-1, 12-2 may constitute a first local pair of wireless devices 12 operating within any of the one or more cells 24 provided by the radio node 20. Correspondingly, the processing circuitry 32 is configured to selectively operate in the loopback mode of traffic handling with respect to individual pairs among one or more additional local pairs of wireless devices 12 operating in any of the one or more cells 24, in dependence on whether or not the gateway node 22 activates the loopback mode of traffic handling for the individual pairs.

It will also be appreciated that, for any given radio bearer that is being used for a local-cell connection between wireless devices 12 in any of the one or more cells 24 and is being reconfigured from the default mode of traffic handling to the loopback mode of traffic handling, the processing circuitry 32 is configured to synchronize the change to the loopback mode of traffic handling with the loopback mode reconfiguration of the radio bearer. This synchronization enables the radio node 20 to being applying its loopback encryption key and related loopback-mode traffic handling to the start of loopback-mode operation by the involved wireless devices 12.

Of further note, in at least some embodiments, a protocol stack used for handling data traffic in the default mode of traffic handling is split between the radio node 20 and the gateway node 22. The processing circuitry 32 in such embodiments is configured to provide physical layer, medium access control, MAC, layer, and radio link control, RLC, layer protocol functions of the protocol stack, and to rely on the gateway node 22 to provide packet data convergence protocol, PDCP, layer functions of the protocol stack. For example, in a LTE embodiment of the network 10, the LTE radio protocol stack is split between the radio node 20 and the gateway node 22, with the gateway node 22 providing the PDCP layer, and the radio node 20 providing the RLC, MAC, and physical, PHY, layers below the PDCP layer.

Figure 2:
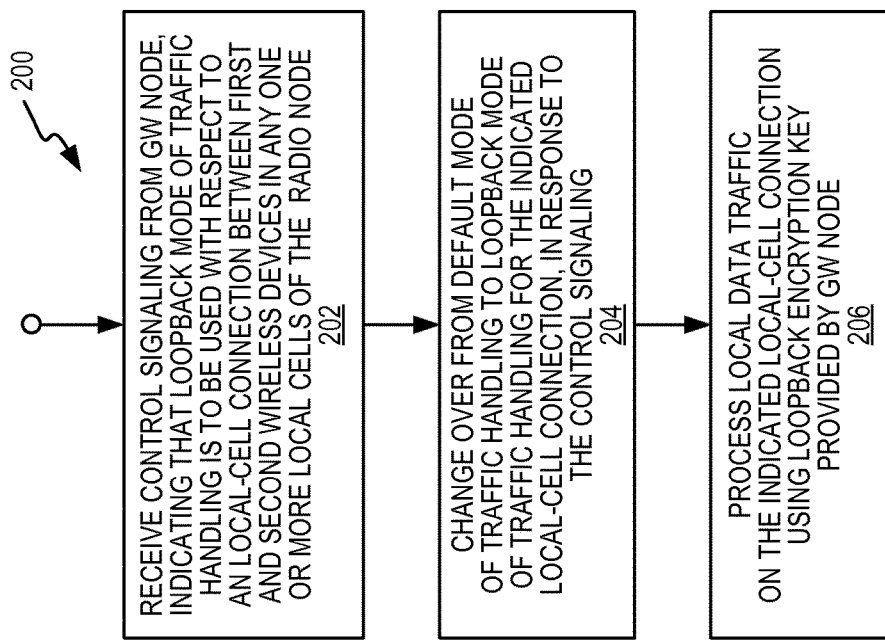
FIG. 2 is a logic flow diagram of one embodiment of a method of processing at a radio node.

FIG. 2 provides another example of the contemplated operation of the radio node 20, and in particular illustrates an example method 200 of processing at a radio node 20. The method 200 includes receiving (Block 202) control signaling from a controlling gateway node 22, indicating that the loopback mode of traffic handling is to be used with respect to a local-cell connection between a first wireless device 12-1 in a cell 24 of the radio node 20 and a second wireless device 12-2 that is also operating in any of the one or more cells 24.

In response to the control signaling, the radio node 20 changes (Block 204) from a default mode of traffic handling to the loopback mode of traffic handling, for the indicated local-cell connection, and, subsequent to changing to the loopback mode of traffic handling, the method 200 includes processing (Block 206) the local data traffic on the indicated local-cell connection according to the loopback mode of traffic handling. As explained before, in the default mode of traffic handling, local data traffic and non-local data traffic sent from any given wireless device 12 in any of the one or more cells 24 provided by the radio node 20 is encrypted by the given wireless device 12 for decryption by the gateway node 22, and the radio node 20 forwards all such data traffic to the gateway node 22 for processing. In contrast, in the loopback mode of traffic handling, local data traffic sent from any given wireless device 12 in any of the one or more cells 24 is encrypted by the given wireless device 12 using a public key from a first public-private key pair allocated to the given wireless device 12 for the loopback mode of traffic handling. Correspondingly, the radio node 20 encrypts the local data traffic with a loopback encryption key derived from a private key contained in the first public-private key pair and a private key contained in a second public-private key pair used by the wireless device 12 targeted by the local data traffic. By applying this further encryption, the radio node 20 obtains local data traffic that is transformed in such a way that the targeted local wireless device 12 can decrypt the transformed local data traffic using the private key of the second public-private key pair.

Turning back to FIG. 1 with respect to a detailed example configuration of the controlling gateway node 22, one sees that the gateway node 22 includes a first communication 50-1 interface for communicating with the radio node 20, and a second communication interface 50-2 for communicating with one or more nodes in the CN 18. These communication interfaces 50 will be understood as including physical layer and protocol processing circuits.

The gateway node 22 further includes processing circuitry 52 that is operatively associated with the first and second communication interfaces 50-1, 50-2. The processing circuitry 52 comprises fixed circuitry, programmed circuitry, or a combination of fixed and programmed circuitry. In an example embodiment, the processing circuitry 52 is at least partly implemented using programmed circuitry and comprises, for example, one or more processors 54, such as one or more microprocessors, Digital Signal Processors or DSPs, Application Specific Integrated Circuits or ASICs, Field Programmable Gate Arrays or FPGAs, or other digital processing circuitry. Correspondingly, the processing circuitry 52 includes or is associated with one or more types of computer-readable media—"STORAGE 56" in the figure—such as one or more types of memory circuits such as FLASH, EEPROM, SRAM, DRAM, etc. Additionally, or alternatively, the storage 56 comprises hard disk storage, Solid State Disk, SSD, storage, etc.

In general, the storage 56 provides both working memory and longer-term storage. In at least one embodiment, the storage 56 provides non-transitory storage for a computer program 58 and one or more items of configuration data 60. Here, "non-transitory" does not necessarily mean permanent or unchanging storage, but does means storage of at least some persistence. The computer program 58, which may comprise a number of related or supporting programs, comprises program instructions that, when executed by the one or more processors 54 implement the processing circuitry 52 according to the configuration examples described herein. In other words, in some embodiments, one or more general-purpose processing circuits within the gateway node 22 are specially adapted to carry out the teachings herein, based on their execution of the computer program instructions comprising the computer program 58.

However implemented, the processing circuitry 52 of the gateway node 22 is configured to select a local-cell connection between first and second wireless devices 12-1, 12-2 that are operating in a cell 24 of a radio node 20 that is controlled by the gateway node 22, for changeover from the default mode of traffic handling to the loopback mode of traffic handling. The processing circuitry 52 is further configured to send control signaling to the radio node 20 and to the first and second wireless devices 12-1 and 12-2, to initiate the changeover to the loopback mode of traffic handling for the selected local-cell connection. Still further, the processing circuitry 52 is configured to provide a loopback encryption key to the radio node 20, for use in encrypting the data traffic looped back by the radio node 20 on the selected local-cell connection. As already explained, the loopback encryption key is derived from the secret keys in first and second public-private key pairs assigned to the first and second wireless devices 12-1, 12-2, respectively, for their operation in the loopback mode of traffic handling.

In at least some embodiments, the processing circuitry 52 of the gateway node 22 is configured to select the local-cell connection based on being configured to obtain capability information for the first and second wireless devices 12-1, 12-2, indicating that the first and second wireless devices 12-1, 12-2 support the loopback mode of traffic handling, and subsequently detect that local data traffic is going between the first and second wireless devices 12-1, 12-2. The processing circuitry 52 is further configured to select the corresponding local-cell connection carrying the local data traffic, for changeover to the loopback mode of traffic handling. In other words, the gateway node 22 is configured such that it identifies or otherwise learns which devices 12 support local loopback operation, and then recognizes when an opportunity to use local loopback arises, based on detecting that local data traffic is flowing between two devices 12 that are operating in the same cell 24 and are both capable of local loopback operation.

In one or more embodiments, the processing circuitry 52 is configured to obtain the capability information by, for each of the first and second wireless devices 12-1, 12-2, receiving an indication from the wireless device 12 during a connection establishment procedure that the wireless device 12 supports the loopback mode of traffic handling. More generally, the gateway node 22 may receiving this type of capability information for any loopback-capable device 12 that connects to the network 10 through a radio node 20 controlled by the gateway node 22. Additionally, or alternatively, the gateway node 22 may receive capability information from one or more other nodes in the network 10, such as during a handover event, or as provisioning information, e.g., where a defined group of devices 12 is pre-associated with the radio node 20.

Further, in at least some embodiments, the processing circuitry 52 is configured to provide the first public-private key pair to the first wireless device 12-1 via encrypted signaling, as part of establishing a connection between the first wireless device 12-1 and the network 10, via a cell 24 provided by the radio node 20. Similarly, the gateway node 22 provides the second public-private key pair to the second wireless device 12-2 via encrypted signaling, as part of establishing a connection between the second wireless device 12-2 and the wireless communication network 10, via a cell provided by the radio node 20. In an LTE embodiment, the encrypted signaling may be the symmetric or secret-key encryption that is provided for by the LTE standard, for the PDCP protocol layer.

In an example implementation, the processing circuitry 52 is configured to obtain the first and second public-private key pairs from a core network node in the CN 18, based on indicating to the CN node that the first and second wireless devices 12-1, 12-2 support the loopback mode of traffic handling. The indication and related return signaling may be performed during the respective connection establishment procedures for the first and second wireless devices 12-1, 12-2.

Similarly, in some embodiments, the processing circuitry 52 is configured to receive the loopback encryption key from a core network node, based on indicating to the core network node that the loopback mode of traffic handling is being activated for a selected local-cell connection. The indication provides, for example, an identification of the involved devices 12, to enable the core network node to determine which public-private key pairs are to be used for generation of the loopback encryption key. At other times, or in other embodiments, the processing circuitry 52 is configured to generate the loopback encryption key for a given loopback mode activation, as a function of the secret keys in the first and second public-private key pairs assigned to the involved devices 12.

In any case, for any given loopback mode activation involving first and second wireless devices 12-1 and 12-2, the selected local-cell connection is represented by one or more allocated radio bearers used to connect the first and second wireless devices 12-1, 12-2 to a cell or cells 24 of the radio node 20. Correspondingly, the processing circuitry 52 is configured to include radio bearer reconfiguration signaling as part of the control signaling sent by it to the responsible radio node 20, to reconfigure the one or more allocated radio bearers for the loopback mode of traffic handling.

Also, as suggested earlier herein, the processing circuitry 52 may be configured to perform PDCP processing for local data traffic flowing between given wireless devices 12 connected to any of the one or more cells 24 of a radio node 20 controlled by the gateway node 22, when the default mode of traffic handling is being used for the given wireless devices 12. Here, the protocol stack used on the network side for handling data traffic from any given device 12 may be split, where a first portion of the protocol stack is implemented at the radio node 20, and where a remaining portion of the protocol stack is implemented at the gateway node 22. As before, in a contemplated split, the radio node 20 implements the PHY, MAC and RLC layers of the protocol stack, while the gateway node 22 implements the PDCP layer residing above the RLC layer and below the "upper" stack layers.

Figure 3:
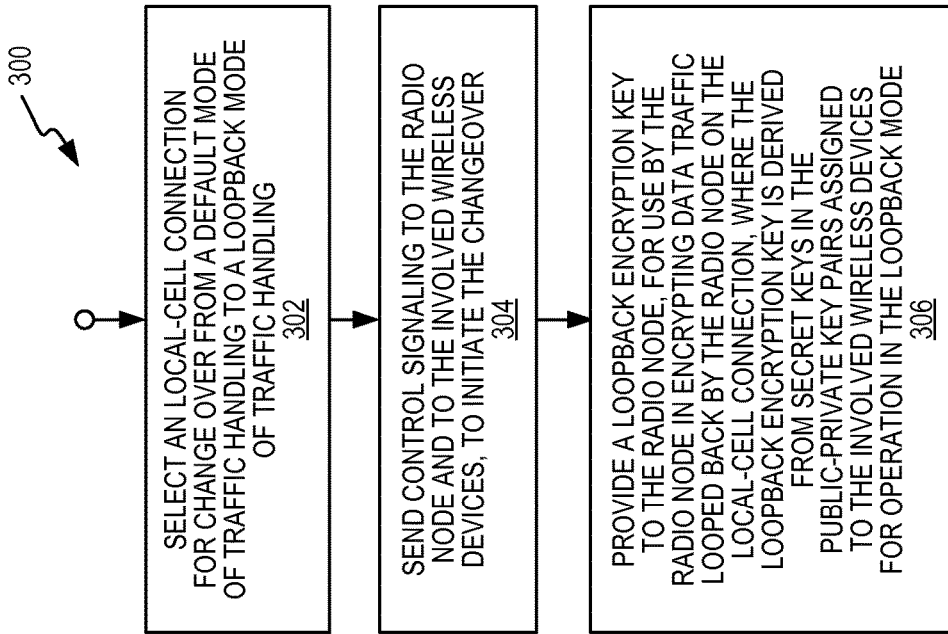
FIG. 3 is a logic flow diagram of one embodiment of a method of processing at a gateway node.

FIG. 3 illustrates an example method 300 of operation at a gateway node 22 that is coupled to a CN 18 of a network 10 and controls a radio node 20 that provides radio coverage in a cell 24 for connecting wireless devices 12 to the network 10. The method 300 includes selecting (Block 302) a local-cell connection between first and second wireless devices 12-1, 12-2 operating in any of the one or more cells 24, for changeover from the default mode of traffic handling to the loopback mode of traffic handling.

The method 300 further includes sending (Block 304) control signaling to the radio node 20 and to the first and second wireless devices 12-1, 12-2, initiating the changeover to the loopback mode of traffic handling for the selected local-cell connection. Further, the method 300 includes providing (Block 306) a loopback encryption key to the radio node 20, for use in encrypting the data traffic looped back by the radio node 20 on the selected local-cell connection. As explained before, the loopback encryption key is derived from the secret keys in first and second public-private key pairs assigned to the first and second wireless devices 12-1, 12-2, respectively, for use in the loopback mode of traffic handling.

Figure 4:
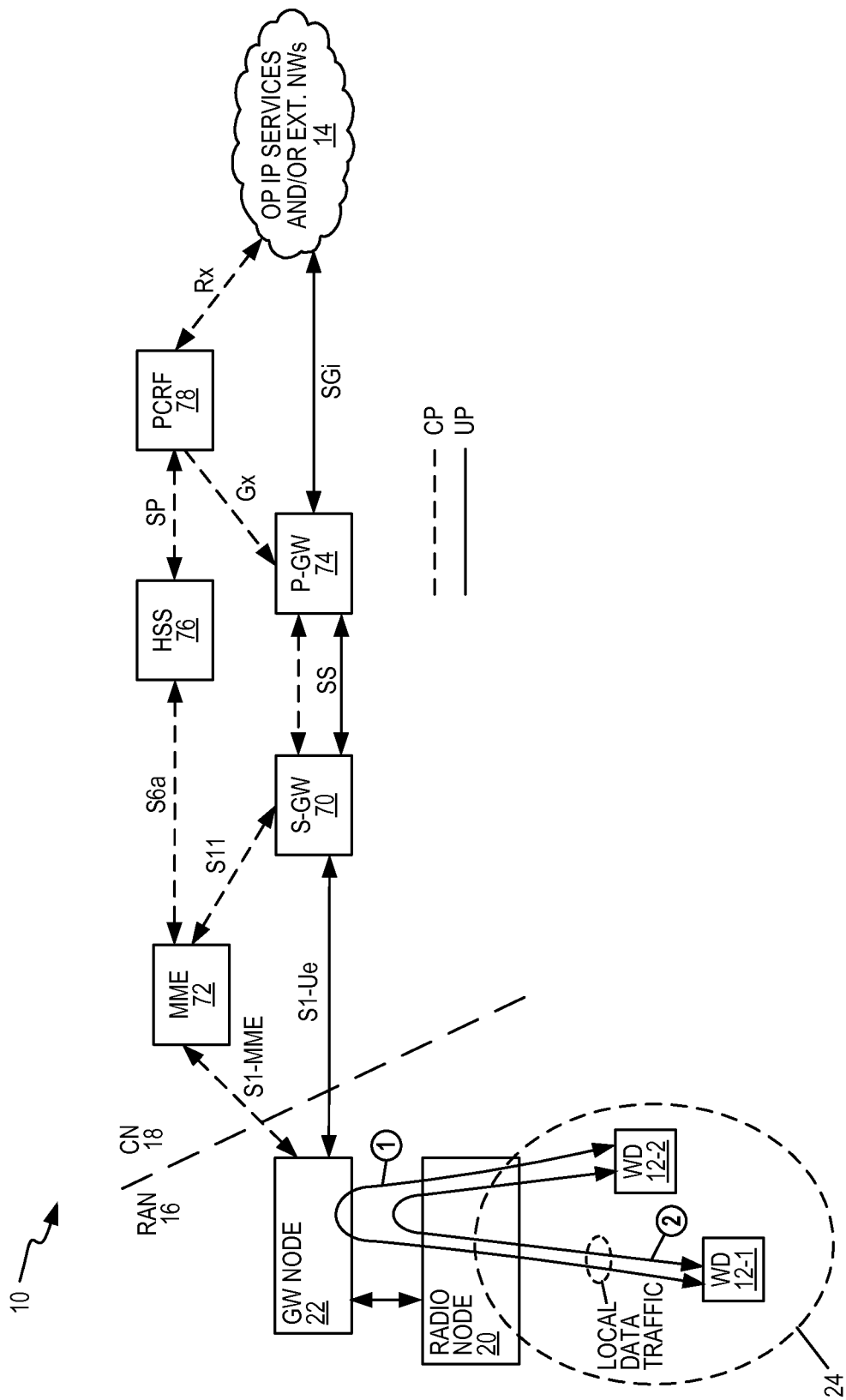
FIG. 4 is a block diagram of another embodiment of a wireless communication network.

FIG. 4 illustrates another embodiment of the network 10 and in particular illustrates a LTE-based implementation of the network 10. The radio node 20 and the gateway node 22 are as described before, but are expressly configured for operation in the LTE context. And in that same context, the CN 18 is shown as including a Serving Gateway or S-GW 70, coupled to the gateway node 22 via a certain "S1" interface. The gateway node 20 is also coupled to a Mobility Management Entity or MME 72, via another S1 interface. Notably, the MME 72 is, in some embodiments, the CN node that provides the local loopback encryption key(s) to the gateway node 22. In turn, a Home Subscriber Server or HSS 76 in one or more embodiments is configured to cooperate with the MME 72 in generating the loopback encryption keys, and the overall network 10 includes a Policy Charging and Rules Function, PCRF, node 78.

The illustration further depicts control plane, CP, and user plane, UP, connections between various nodes in the network 10, including between the S-GW 70 and a Packet Gateway or P-GW 74. The P-GW 74 provides the overall "SGi" packet data interface between the network 10 and the external network(s) 14.

FIG. 4 illustrates a flow path "1" and a flow path "2", which represent possible flow paths for local data traffic flowing between first and second devices 12-1 and 12-2 operating in any of the one or more cells 24. In particular, the local-cell data traffic flowing from the device 12-1 and targeting the device 12-2 follows the flow path 1 when the radio node 20 and the devices 12 are operating in the default or normal mode of traffic handling. In this mode, the devices 12 encrypt outgoing traffic using the secret encryption keys provided by the network 10, for their operation as PDCP endpoints with respect to the PDCP layer implemented at the gateway node 22, where that PDCP layer provides complementary ciphering and deciphering.

In contrast, the local data traffic, also referred to as local-cell traffic, flowing from the first device 12-1 and targeting the second device 12-2 follows the flow path 2 when the radio node 20 and the devices 12 are operating in the loopback mode of traffic handling. As explained, the devices 12 in this mode are assigned respective public-private key pairs. In the loopback mode of operation, the device 12-1 encrypts outgoing traffic for the device 12-2 using the public key of the public-private key pair assigned to the device 12-1. The radio node 20 further encrypts this traffic using the applicable loopback encryption key. Because that key is derived from the secret keys contained in the public-private key pairs of the first and second devices 12-1 and 12-2, this further encryption transforms the traffic into a form that can be decrypted at the second device 12, using the secret key in the public-private key pair assigned to the second device 12-2.

Thus, in this embodiment of the loopback mode of traffic handling, the device 12-1 encrypts the outgoing PDCP PDUs targeting the second device 12-2, and the radio node 20 applies the above-described transformative encryption on those PDCP PDUs, using the loopback encryption key. Then the radio node 20 loops the transformed traffic back to the RLC layer destined for the second device 12-2. Thus, other than changing the encryption and decryption keys being used, the first and second wireless devices 12-1 and 12-2 can otherwise operate normally during the loopback mode of traffic handling, e.g., generate outgoing PDCP PDUs as normal, but encrypt those outgoing PDCP PDUs using the appropriate public key assigned for loopback use, rather than the network-assigned secret key used when encrypting towards the PDCP layer in the gateway node 22.

FIGS. 5 and 6 provide useful illustrations of the involved protocol stacks, both for the prior art, non-split case, as seen in FIG. 5, and for the split-stack case contemplated in some embodiments herein, a seen in FIG. 6. In FIG. 5, a LTE base station, an "eNB", implements the LTE protocol stack as a PHY layer, a MAC layer, a RLC layer, a PDCP layer, and a RRC layer, with further, upper layers above the RRC layer. In FIG. 6, the PDCP layer is split, such that at least a "PDCP stub" is implemented at the radio node 20, for performing the above-described transformative encryption processing in the local loopback mode of traffic handling, and for simply passing traffic along normally in the normal mode of traffic handling.

Correspondingly, the gateway node 22 has a fully functional PDCP layer, to perform its full range of functions during normal traffic handling, including providing the ciphering and deciphering functions provided at the PDCP layer. The PDCP split may be implemented using a self-contained Internet Protocol, IP, connection between the PDCP stub at the radio node 20 and the PDCP layer at the gateway node 22. Here, it will be understood that the IP endpoints are the PDCP stub at the radio node 20 and the PDCP layer at the gateway node 22.

Figure 7A:
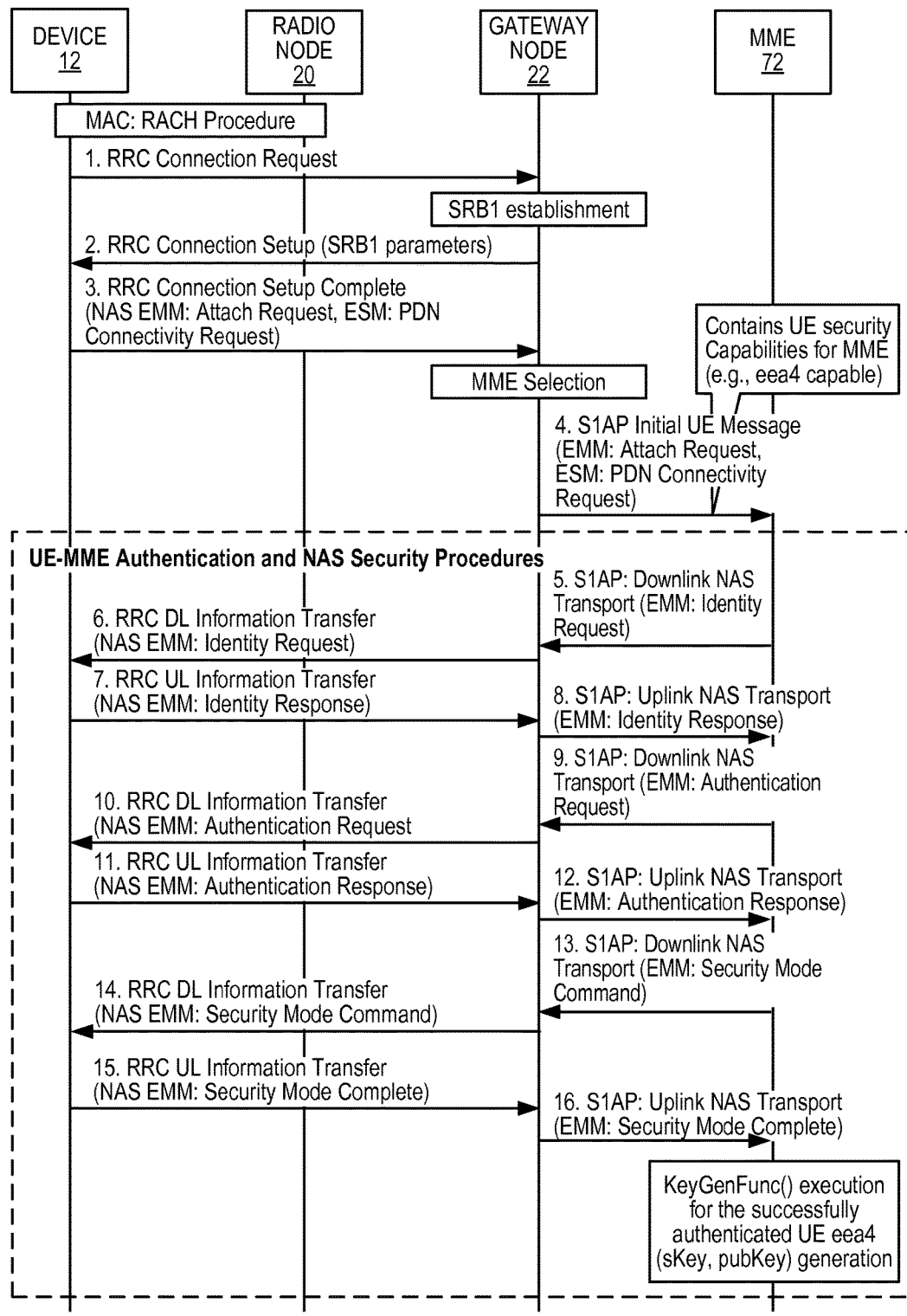
FIGS. 7A and 7B are signaling diagrams for example signaling between a radio node and a controlling gateway node according to one embodiment.
Figure 7B:
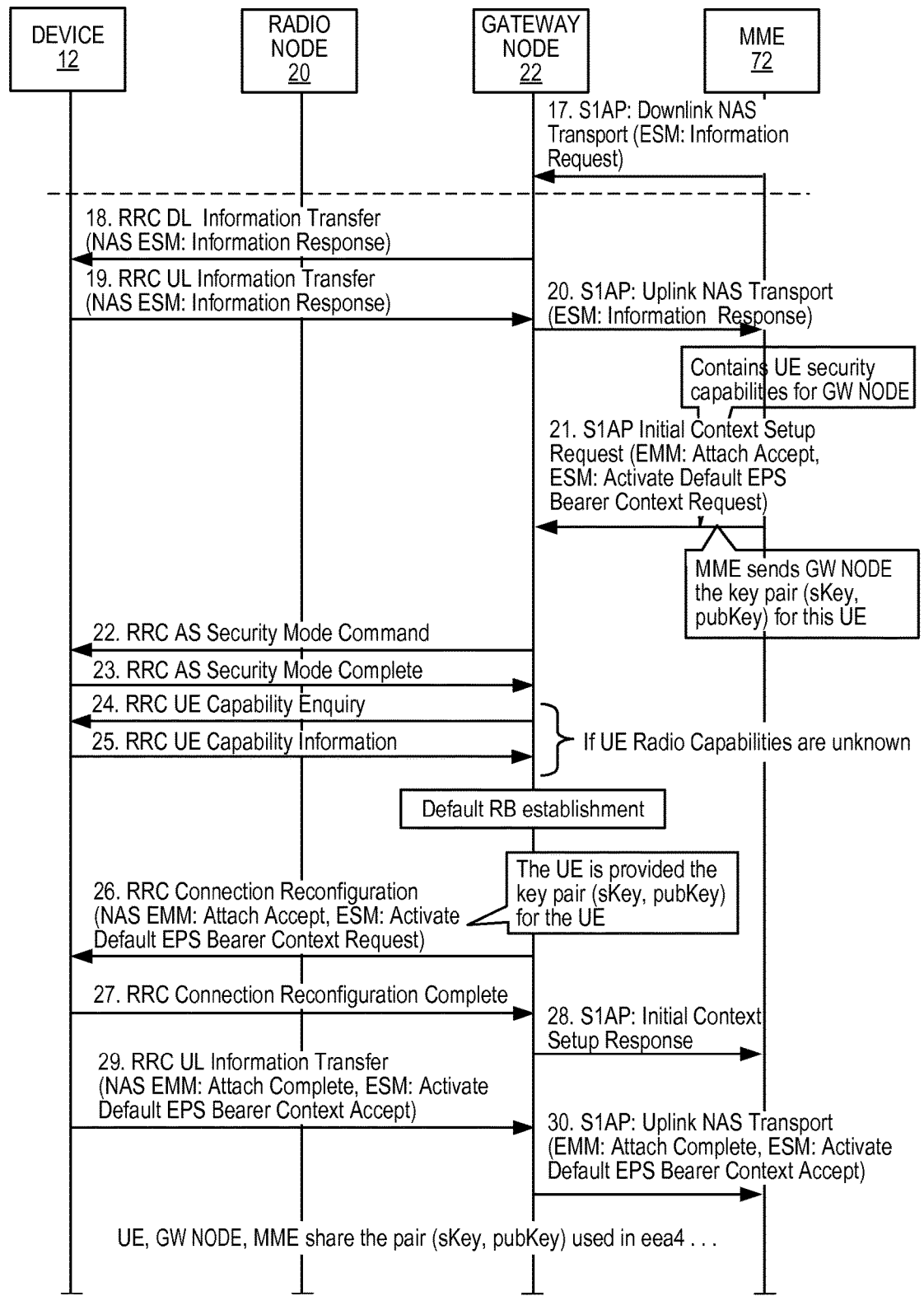

Steps 1-30 illustrated in the signaling flow diagram of FIGS. 7A and 7B, along with their associated operations, provides example operations. In more detail, Steps 1-4 illustrate an initial establishment procedure in the LTE context. Of particular note, at Step 4, the initial S1AP message from the gateway node 22 to the MME 72 for the attaching device 12, denoted in the message text as a "UE" or "user equipment", includes an "eea4 capable" indication, which in this disclosure denotes the capability of the device 12 to operate in the local loopback mode of traffic handling. The LTE standards use an Evolved Packet System, EPS, Encryption Algorithm, EEA, which is denoted as EEA. The "eea4" designation thus indicates that the encryption and key management associated with the loopback mode of traffic handling can be regarded as a new or extended encryption algorithm that can be similarly adopted by the LTE standards. Of course, the teachings herein not restricted to the LTE context.

Steps 5-17 represent UE-MME authentication and Non-Access Stratum, NAS, security procedures, largely as known from the LTE standards, but with key enhancements associated with the loopback mode of traffic handling. In particular, after Step 16, the MME 72 performs a key generation operation, denoted as KeyGenFunc( ), in which it generates the secret key, sKey, and public key, pubKey, comprising the public-private key pair to be used for loopback mode operation of the device 12. The key generation here may be based on, for example, the International Mobile Subscriber Identity, IMSI, or other identifier uniquely associated with the device 12.

The MME 72 later provides the public-private key pair to the gateway node 22, e.g., as seen in the S1AP message seen at Step 21. The reader may refer to the 3GPP Technical Specification TS 24.008, Section 10, for details regarding conventional aspects of Layer 3 signaling according to the defined core network protocols. Later, e.g., at Step 26, as part of RRC connection reconfiguration, the public-private key pair for the device 12 is provided to the device 12. Notably, this signaling will be understood as being protected by the encryption normally applied in the LTE context. As a consequence of completing the described signaling operations, the device 12, the gateway node 22, and the MME 72 all know the public-private key pair allocated to the device 12, for its use in the loopback mode of traffic handling.

Figure 8:
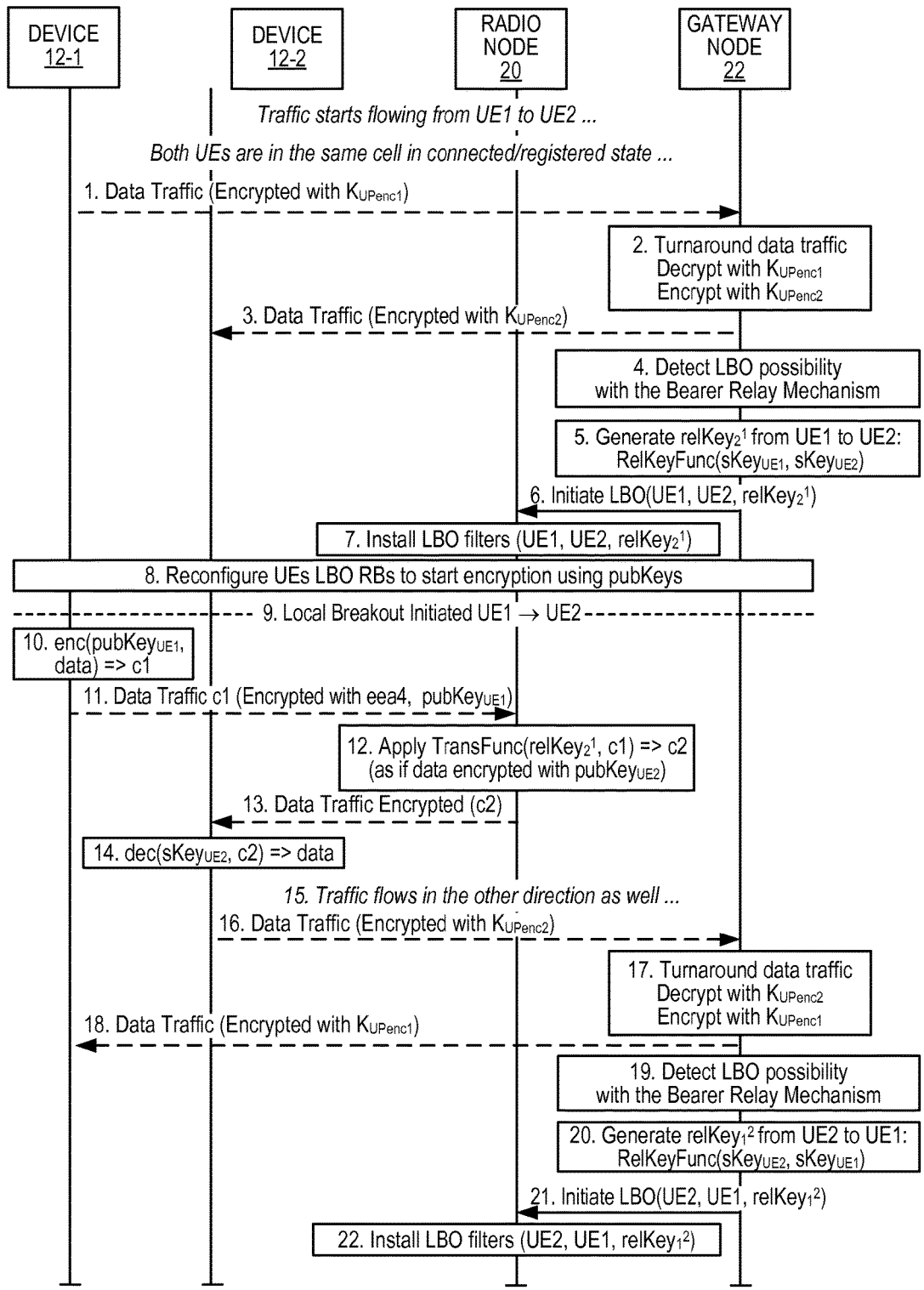
FIG. 8 is a signaling diagram for further example signaling between a radio node and a controlling gateway node according to one embodiment.

FIG. 8 assumes that the processing of FIGS. 7A and 7B has been completed with respect to two given devices 12-1 and 12-2, and that both devices 12 are capable of operating in the loopback mode of traffic handling—in the diagram, "LBO" denotes "Local Breakout Operation", which is another term for the local loopback mode of operation.

With both devices 12-1 and 12-2 registered in any one or more of the one or more cells 24 under control of the radio node 20, the first device 12-1 begins sending data traffic in the default or normal mode of traffic handling, targeting the second device 12-2. In the LTE context, because this data traffic is sent according to the default mode of traffic handling, the first device 12-1 uses its normal EEA2 encryption key, $K_{UPenc1}$, for encrypting the outgoing PDCP PDUs comprising the data traffic. The radio node 20 correspondingly passes the encrypted traffic along to the gateway node 22 for conventional PDCP layer processing at the gateway node 22.

At Step 2, the gateway node 22 performs such processing, which includes decrypting the data traffic using the $K_{UPenc1}$ encryption key of the first device 12-1. Then, because that data traffic is targeted to the second device 12-2, the gateway node 22 re-encrypts the decrypted data traffic using the normal EEA2 encryption key of the second device 12-2, denoted as $K_{UPenc2}$. The re-encrypted data traffic is then returned to the radio node 20, for over-the-air delivery to the second wireless device 12-2.

Advantageously, however, the gateway node 22 is configured to detect this circumstance as a LBO opportunity—i.e., an opportunity to change from the default mode of traffic handling to the local loopback mode of traffic handling, for the local data traffic flowing from the first wireless device 12-1 to the second wireless device 12-2. In at least one embodiment, the recognition is based on: (1) recognizing that a given data traffic flow is a local flow going between source and target devices 12 in any one or more of the cells 24 provided by the radio node 20; and (2) determining that the source and target devices 12 are capable of operating in the local loopback mode. The recognition may be further based on verifying or confirming that the source and target devices 12 have in fact been allocated public-private key pairs for use in local loopback mode within any of the one or more cells 24. Such operations are seen in Step 4.

At Step 5, the gateway node 22 generates the loopback encryption key, $relKey_2^1$, from the secret keys of the first and second devices 12-1 and 12-2. Here, the subscript "2" denotes the second device 12-2, "UE2", as being the target, and the superscript "1" denotes the first device 12-1, "UE1", as being the source. In other words, in this example, the generated loopback encryption key is directional, for use in local data traffic flowing from the first device 12-1 to the second device 12-2. A similar key, $relKey_1^2$, would be generated and used to handle local data traffic flowing in the opposite direction, from the second device 12-2 as the source, to the first device 12-1 as the target.

At Step 6, the gateway node 22 initiates the local loopback mode of traffic handling for the involved local-cell connection—i.e., for the involved radio bearers and traffic flow. At Step 7, the radio node 20 installs the corresponding LBO "filter", which term describes the radio node 20 reconfiguring itself with the appropriate processing and information, such that it recognizes and process the involved local data traffic according to the local loopback mode. At Step 8, the gateway node 22—working through the radio node 20—reconfigures the Radio Bearers, RBs, associated with the involved local data traffic, for local loopback mode.

Correspondingly, at Step 10, the first device 12-1 changes over from using the $K_{UPenc1}$ key for encrypting the outgoing local data traffic in the involved flow, to using the public key, $pubKey_{UE1}$, included in the public-private key pair assigned to the first device 12-1 for operation in the local loopback mode. The thus encrypted local data traffic is denoted as "c1" and at Step 12 the radio node 20 transforms that traffic by further encrypting it using $relKey_2^1$. The resulting encrypted version of the local data traffic is denoted as "c2", i.e., the transformed data traffic is denoted as c2, and the radio node 20 sends the transformed data traffic to the second device 12-2. Because of the transformation performed by the radio node 20 is based on the secret keys, $sKey_{UE1}$, $sKey_{UE2}$, of the public-private key pairs assigned to the first and second devices 12-1 and 12-2, the second device 12-2 can decrypt the transformed traffic using the secret key, $sKey_{UE2}$. Steps 16-22 illustrate substantially the same operations, except for traffic flowing in the opposite direction, with the second device 12-2 being the source and the first device 12-1 being the target.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation in a radio node that provides radio coverage in one or more cells local to the radio node, where the radio node is controlled by a gateway node that is coupled to a core network of a wireless communication network, and the method comprises selectively operating in a loopback mode of traffic handling for local data traffic going between given wireless devices operating in any of the one or more cells, based on:
   receiving control signaling from the gateway node indicating that the loopback mode of traffic handling is to be used with respect to a local-cell connection between a first wireless device in one of the one or more cells and a second wireless device in the same or another one of the one or more cells;
   in response to the control signaling, changing from a default mode of traffic handling to the loopback mode of traffic handling, for the indicated local-cell connection; and
   subsequent to changing to the loopback mode of traffic handling, processing the local data traffic on the indicated local-cell connection according to the loopback mode of traffic handling;
   wherein, in the default mode of traffic handling, local data traffic and non-local data traffic sent from a given wireless device in any of the one or more cells is encrypted by the given wireless device for decryption by the gateway node, and the radio node forwards all such data traffic to the gateway node for processing;
   wherein, in the loopback mode of traffic handling, local data traffic sent from a given wireless device in any of the one or more cells is encrypted by the given wireless device using a public key from a first public-private key pair allocated to the given wireless device for the loopback mode of traffic handling, and the radio node encrypts the local data traffic with a loopback encryption key derived from a private key contained in the first public-private key pair and a private key contained in a second public-private key pair used by another given wireless device that is in any of the one or more cells and is targeted by the local data traffic, thereby obtaining transformed local data traffic that is decipherable by the targeted wireless device via the private key of the second public-private key pair, and wherein the radio node transmits the transformed data traffic to the targeted wireless device.

2. The method of claim 1, further comprising receiving the loopback encryption key for the indicated local-cell connection from the gateway node.

3. The method of claim 1, wherein the control signaling indicates the local-cell connection by identifying at least one of: a radio bearer used for the local-cell connection, and the first and second wireless devices.

4. The method of claim 1, wherein changing from the default mode of traffic handling to the loopback mode of traffic handling, for the indicated local-cell connection includes synchronizing the change with a reconfiguration of a radio bearer used for the local-cell connection.

5. The method of claim 1, wherein the control signaling received at the radio node indicates that the loopback mode of traffic handling shall be used for local data traffic going between the first and second wireless devices in a first direction, and wherein changing to the loopback mode of traffic handling is done with respect to the first direction but not with respect to local data traffic going between the first and second wireless devices in an opposite, second direction, unless the same or subsequent control signaling indicates that the loopback mode of traffic handling shall be used for the second direction.

6. The method of claim 1, wherein receiving control signaling from the gateway node indicating that the loopback mode of traffic handling is to be used with respect to the local-cell connection between the first and second wireless devices comprises receiving identifiers for the first and second wireless devices and receiving the loopback encryption key to be used for operating in the loopback mode of traffic handling with respect to the local-cell connection.

7. The method of claim 1, wherein the first and second wireless devices constitute a first local pair of wireless devices, and wherein the method includes selectively operating in the loopback mode of traffic handling with respect to individual pairs among one or more additional local pairs of wireless devices operating in any of the one or more cells, in dependence on whether or not the gateway node activates the loopback mode of traffic handling for the individual pairs.

8. The method of claim 1, wherein a protocol stack used for handling data traffic in the default mode of traffic handling is split between the radio node and the gateway node, and wherein the method includes performing physical layer, medium access control layer, and radio link control layer protocol functions of the protocol stack at the radio node, while relying on the gateway node to provide packet data convergence protocol layer functions of the protocol stack.

9. A radio node configured to provide radio coverage in one or more cells, the radio node comprising:
   a first communication interface configured for communicating with given wireless devices operating in any of the one or more cells;
   a second communication interface configured to communicatively couple the radio node to a controlling gateway node that is coupled to a core network of a wireless communication network; and
   processing circuitry that is operatively associated with the first and second communication interfaces and configured to selectively operate in a loopback mode of traffic handling for local data traffic going between the given wireless devices operating in any of the one or more cells, based on being configured to:
receive control signaling from the gateway node indicating that the loopback mode of traffic handling is to be used with respect to a local-cell connection between a first wireless device in any of the one or more cells and a second wireless device in any of the one or more cells;
in response to the control signaling, change from a default mode of traffic handling to the loopback mode of traffic handling, for the indicated local-cell connection; and
subsequent to changing to the loopback mode of traffic handling, process the local data traffic on the indicated local-cell connection according to the loopback mode of traffic handling;
wherein, in the default mode of traffic handling, local data traffic and non-local data traffic sent from a given wireless device in any of the one or more cells is encrypted by the given wireless device for decryption by the gateway node, and the processing circuitry forwards all such data traffic to the gateway node for processing;
wherein, in the loopback mode of traffic handling, local data traffic sent from a given wireless device in any of the one or more cells is encrypted by the given wireless device using a public key from a first public-private key pair allocated to the given wireless device for the loopback mode of traffic handling, and the processing circuitry encrypts the local data traffic with a loopback encryption key derived from a private key contained in the first public-private key pair and a private key contained in a second public-private key pair used by another given wireless device that is in any of the one or more cells and is targeted by the local data traffic, thereby obtaining transformed local data traffic that is decipherable by the targeted wireless device via the private key of the second public-private key pair, and wherein the processing circuitry transmits the transformed data traffic to the targeted wireless device, via the first communication interface.

10. The radio node of claim 9, wherein the processing circuitry is configured to receive the loopback encryption key for the indicated local-cell connection from the gateway node.

11. The radio node of claim 9, wherein the processing circuitry is configured to determine the local-cell connection based on the control signaling identifying at least one of: a radio bearer used for the local-cell connection, and the first and second wireless devices.

12. The radio node of claim 9, wherein the processing circuitry is configured to synchronize the change to the loopback mode of traffic handling with a reconfiguration of a radio bearer used for the local-cell connection.

13. The radio node of claim 9, wherein the control signaling received at the radio node indicates that the loopback mode of traffic handling shall be used for local data traffic going between the first and second wireless devices in a first direction, and wherein the processing circuitry is configured to change to the loopback mode of traffic handling with respect to the first direction but not with respect to local data traffic going between the first and second wireless devices in an opposite, second direction, unless the control signaling, or subsequent control signaling, indicates that the loopback mode of traffic handling shall be used for the second direction.

14. The radio node of claim 9, wherein, as said control signaling received from the gateway node, the processing circuitry is configured to receive identifiers for the first and second wireless devices and further to receive the loopback encryption key to be used for operating in the loopback mode of traffic handling with respect to the local-cell connection.

15. The radio node of claim 9, wherein the first and second wireless devices constitute a first local pair of wireless devices, and wherein the processing circuitry is configured to selectively operate in the loopback mode of traffic handling with respect to individual pairs among one or more additional local pairs of wireless devices operating in any of the one or more cells, in dependence on whether or not the gateway node activates the loopback mode of traffic handling for the individual pairs.

16. The radio node of claim 9, wherein a protocol stack used for handling data traffic in the default mode of traffic handling is split between the radio node and the gateway node, and wherein the processing circuitry is configured to provide physical layer, medium access control layer, and radio link control layer protocol functions of the protocol stack, and to rely on the gateway node to provide packet data convergence protocol layer functions of the protocol stack.

17. A method of operation in a gateway node that is coupled to a core network of a wireless communication network and controls a radio node that provides radio coverage in one or more cells for connecting given wireless devices to the wireless communication network, the method comprising:
selecting a local-cell connection between first and second wireless devices operating in any of the one or more cells, for changeover from a default mode of traffic handling to a loopback mode of traffic handling;
sending control signaling to the radio node and to the first and second wireless devices, initiating the changeover to the loopback mode of traffic handling for the selected local-cell connection; and
providing a loopback encryption key to the radio node, for use in encrypting data traffic looped back by the radio node on the selected local-cell connection, wherein the loopback encryption key is derived from secret keys in first and second public-private key pairs assigned to the first and second wireless devices, respectively, for use in the loopback mode of traffic handling;
wherein, in the default mode of traffic handling, local data traffic and non-local data traffic sent from a given wireless device in any of the one or more cells is encrypted by the given wireless device for decryption by the gateway node, and the radio node forwards all such data traffic to the gateway node for processing;
wherein, in the loopback mode of traffic handling, local data traffic sent from a given wireless device in any of the one or more cells is encrypted by the given wireless device using a public key from a first public-private key pair allocated to the given wireless device for the loopback mode of traffic handling, and the radio node encrypts the local data traffic with a loopback encryption key derived from a private key contained in the first public-private key pair and a private key contained in a second public-private key pair used by another given wireless device that is in any of the one or more cells and is targeted by the local data traffic, thereby obtaining transformed local data traffic that is decipherable by the targeted wireless device via the private key of the second public-private key pair, and wherein the radio node transmits the transformed data traffic to the targeted wireless device.

18. The method of claim 17, wherein selecting the local-cell connection comprises obtaining capability information for the first and second wireless devices, indicating that the first and second wireless devices support the loopback mode of traffic handling, subsequently detecting that local data traffic is going between the first and second wireless devices, and selecting a corresponding local-cell connection carrying the local data traffic, for changeover to the loopback mode of traffic handling.

19. The method of claim 18, wherein obtaining the capability information comprises, for each of the first and second wireless devices, receiving an indication from the wireless device during a connection establishment procedure that the wireless device supports the loopback mode of traffic handling.

20. The method of claim 17, wherein the method includes providing the first public-private key pair to the first wireless device via encrypted signaling, as part of establishing a connection via any of the one or more cells between the first wireless device and the wireless communication network, and providing the second public-private key pair to the second wireless device via encrypted signaling, as part of establishing a connection via any of the one or more cells between the second wireless device and the wireless communication network.

21. The method of claim 20, further comprising obtaining the first and second public-private key pairs from a core network node in the core network, based on indicating to the core network node during respective connection establishment procedures for the first and second wireless devices that the first and second wireless devices support the loopback mode of traffic handling.

22. The method of claim 17, further comprising obtaining the loopback encryption key based on one of:
generating the loopback encryption key at the gateway node as a function of the secret keys in the first and second public-private key pairs; or
receiving the loopback encryption key from a core network node, based on indicating to the core network node that the loopback mode of traffic handling is being activated for the selected local-cell connection.

23. The method of claim 17, wherein the selected local-cell connection is represented by one or more allocated radio bearers used to connect the first and second wireless devices to any of the one or more cells, and wherein the control signaling includes radio bearer reconfiguration signaling, to reconfigure the one or more allocated radio bearers for the loopback mode of traffic handling.

24. The method of claim 17, further comprising performing packet data convergence protocol processing at the gateway node for local data traffic flowing between the given wireless devices connected to any of the one or more cells, when the default mode of traffic handling is being used for the given wireless devices, based on a split protocol stack wherein a first portion of a protocol stack for handling data traffic is implemented at the radio node, and wherein a remaining portion of the protocol stack is implemented at the gateway node, said first portion comprising physical, medium access control, and radio link layers, and said remaining portion comprising a packet data convergence protocol layer.

25. A gateway node that is configured for communicatively coupling to a core network of a wireless communication network and controlling a radio node that provides radio coverage in one or more cells for connecting given wireless devices to the wireless communication network, the gateway node comprising:
a first communication interface for communicating with the radio node;
a second communication interface for communicating with one or more nodes in the core network; and
processing circuitry operatively associated with the first and second communication interfaces and configured to:
select a local-cell connection between first and second wireless devices operating in any of the one or more cells, for changeover from a default mode of traffic handling to a loopback mode of traffic handling,
send control signaling to the radio node and to the first and second wireless devices, to initiate the changeover to the loopback mode of traffic handling for the selected local-cell connection; and
provide a loopback encryption key to the radio node, for use in encrypting data traffic looped back by the radio node on the selected local-cell connection, wherein the loopback encryption key is derived from secret keys in first and second public-private key pairs assigned to the first and second wireless devices, respectively, for use in the loopback mode of traffic handling;
wherein, in the default mode of traffic handling, local data traffic and non-local data traffic sent from a given wireless device in any of the one or more cells is encrypted by the given wireless device for decryption by the gateway node, and the radio node forwards all such data traffic to the gateway node for processing;
wherein, in the loopback mode of traffic handling, local data traffic sent from a given wireless device in any of the one or more cells is encrypted by the given wireless device using a public key from a first public-private key pair allocated to the given wireless device for the loopback mode of traffic handling, and the radio node encrypts the local data traffic with a loopback encryption key derived from a private key contained in the first public-private key pair and a private key contained in a second public-private key pair used by another given wireless device that is in any of the one or more cells and is targeted by the local data traffic, thereby obtaining transformed local data traffic that is decipherable by the targeted wireless device via the private key of the second public-private key pair, and wherein the radio node transmits the transformed data traffic to the targeted wireless device.

26. The gateway node of claim 25, wherein the processing circuitry is configured to select the local-cell connection based on being configured to obtain capability information for the first and second wireless devices, indicating that the first and second wireless devices support the loopback mode of traffic handling, subsequently detect that local data traffic is going between the first and second wireless devices, and select a corresponding local-cell connection carrying the local data traffic, for changeover to the loopback mode of traffic handling.

27. The gateway node of claim 26, wherein the processing circuitry is configured to obtain the capability information by, for each of the first and second wireless devices, receiving an indication from the wireless device during a connection establishment procedure that the wireless device supports the loopback mode of traffic handling.

28. The gateway node of claim 25, wherein the processing circuitry is configured to provide the first public-private key pair to the first wireless device via encrypted signaling, as part of establishing a connection via any of the one or more cells between the first wireless device and the wireless communication network, and provide the second public-private key pair to the second wireless device via encrypted signaling, as part of establishing a connection via any of the one or more cells between the second wireless device and the wireless communication network.

29. The gateway node of claim 28, wherein the processing circuitry is configured to obtain the first and second public-private key pairs from a core network node in the core network, based on indicating to the core network node that the first and second wireless devices support the loopback mode of traffic handling, during respective connection establishment procedures for the first and second wireless devices.

30. The gateway node of claim 25, wherein the processing circuitry is configured to obtain the loopback encryption key based on being configured to:
generate the loopback encryption key at the gateway node as a function of the secret keys in the first and second public-private key pairs; or
receive the loopback encryption key from a core network node, based on indicating to the core network node that the loopback mode of traffic handling is being activated for the selected local-cell connection.

31. The gateway node of claim 25, wherein the selected local-cell connection is represented by one or more allocated radio bearers used to connect the first and second wireless devices to any of the one or more cells, and wherein the processing circuitry is configured to include in the control signaling radio bearer reconfiguration signaling, to reconfigure the one or more allocated radio bearers for the loopback mode of traffic handling.

32. The gateway node of claim 25, wherein the processing circuitry is configured to perform packet data convergence protocol processing at the gateway node for local data traffic flowing between the given wireless devices connected to any of the one or more cells, when the default mode of traffic handling is being used for the given wireless devices, based on a split protocol stack wherein a first portion of a protocol stack for handling data traffic is implemented at the radio node, and wherein a remaining portion of the protocol stack is implemented at the gateway node, said first portion comprising physical, medium access control, and radio link layers, and said remaining portion comprising a packet data convergence protocol layer.

* * * * *